United States Patent
Spiegelman et al.

(10) Patent No.: US 6,468,333 B2
(45) Date of Patent: Oct. 22, 2002

(54) GAS PURIFIER APPARATUS

(75) Inventors: Jeffrey J. Spiegelman, La Jolla; Michael George Rixon, El Cajon, both of CA (US)

(73) Assignee: Aeronex, Inc., San Diego, CA (US)

( * ) Notice: Subject to any disclaimer, the term of this patent is extended or adjusted under 35 U.S.C. 154(b) by 0 days.

(21) Appl. No.: 09/767,427

(22) Filed: Jan. 22, 2001

(65) Prior Publication Data

US 2002/0134247 A1 Sep. 26, 2002

(51) Int. Cl.⁷ .............................................. B01D 46/00
(52) U.S. Cl. .............. 96/135; 55/410; 55/487; 55/516
(58) Field of Search .................. 96/147, 108, 135; 55/330, 410, 487, 515, 516, 518, 307, 441, 512, DIG. 30; 210/446, 438

(56) References Cited

U.S. PATENT DOCUMENTS

| | | | |
|---|---|---|---|
| 245,109 A | * | 8/1881 | Westinghouse Jr. |
| 2,557,557 A | * | 6/1951 | Nuwcum |
| 3,016,108 A | * | 1/1962 | Myddelton |
| 3,094,394 A | * | 6/1963 | Innes et al. |
| 3,960,509 A | * | 6/1976 | Abrianyt |
| RE30,682 E | * | 7/1981 | Bush |
| 4,290,263 A | * | 9/1981 | Mann et al. |
| 4,318,720 A | * | 3/1982 | Hoggatt |
| 4,781,900 A | | 11/1988 | Tom et al. |
| 5,348,573 A | * | 9/1994 | Tomassian et al. |
| 5,716,588 A | | 2/1998 | Vergani |

FOREIGN PATENT DOCUMENTS

| | | |
|---|---|---|
| JP | 04124001 | 4/1992 |
| WO | WO 99/22848 | 5/1999 |

* cited by examiner

*Primary Examiner*—David A. Simmons
*Assistant Examiner*—Frank M. Lawrence
(74) *Attorney, Agent, or Firm*—Brown, Martin, Haller & McClain, LLP

(57) ABSTRACT

The present invention relates to an apparatus used for gas purification in a manner that allows for higher flow rates without an unacceptable increase in the pressure vessel diameter. The purifier contains inner and outer filter sleeves. Between the sleeves is contained a purification medium that allows for radial flow of the gas from the inner filter sleeve to the outer filter sleeve, via the purification medium, in order to be released from the purifier.

28 Claims, 2 Drawing Sheets

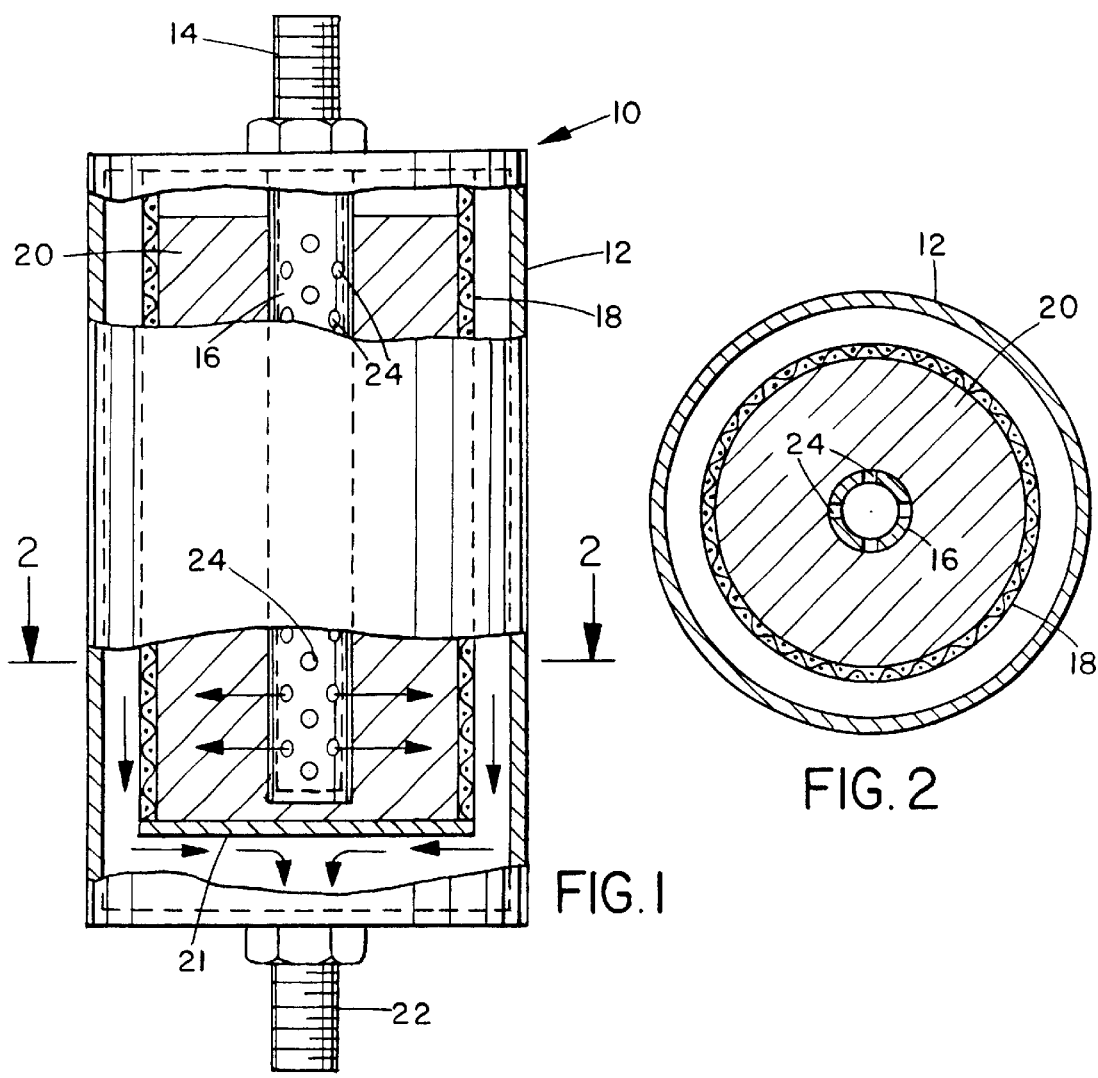
FIG. 2
FIG. 1
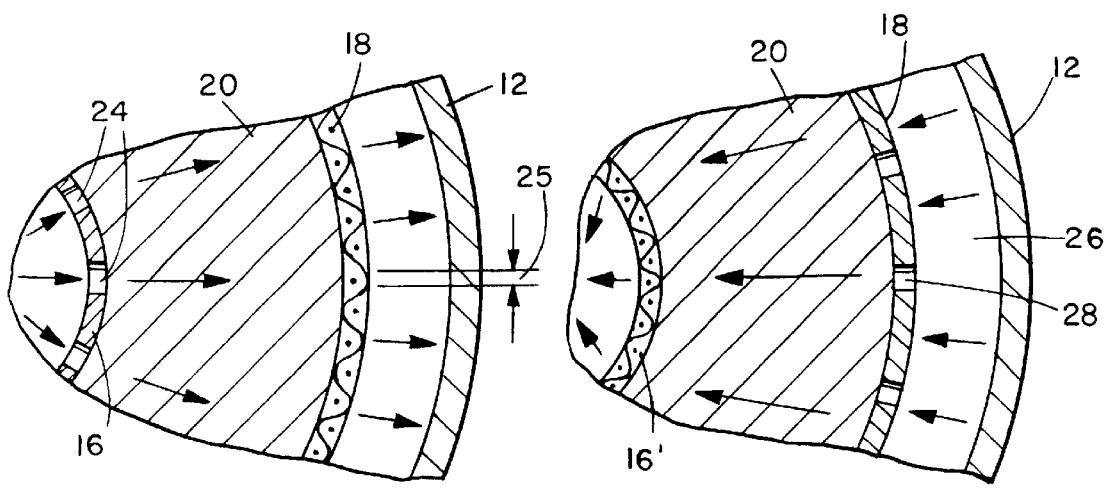
FIG. 3
FIG. 4

GAS PURIFIER APPARATUS

BACKGROUND OF THE INVENTION

The present invention relates to a gas purifier apparatus for removing contaminants or impurities from gas streams, and is particularly concerned with an ultra high purity gas purifier for purifying gases to purity levels of at least 1 ppm.

Known gas purifiers typically comprise a cylindrical outer housing or canister having an inlet port at one end for receiving a gas to be purified, and an outlet port at the opposite end for exit of purified gas from the housing. The housing is filled with a suitable gas purification medium and filter through which the gas passes while traveling in a generally axial direction from the inlet port to the outlet port. The purification medium is of any suitable material or materials for removing the contaminants by absorption or the like.

One problem with prior art axial flow gas purifiers is the limitation in purifier capacity for a given flow and purifier volume. Higher gas flow rates require a greater volume of purification media in order to maintain capacity and purification efficiency. Although it is always less costly to increase the length of the purifier housing, rather than it's diameter, significant length increase will result in lower flow rates for a given pressure drop or unacceptably high pressure drop. Thus, in practice, the only way to accommodate a higher flow rate in an axial flow purifier is to increase the housing diameter. If the inner diameter of the housing is increased to greater than six inches, it becomes an ASME (American Society of Mechanical Engineers) regulated pressure vessel, which must have thicker walls, is more expensive to manufacture, due to regulated requirements, and must have government approval. Thus, there is a need for a gas purifier which permits higher flow rates at the same pressure drop, without increasing diameter.

SUMMARY OF THE INVENTION

It is an object of the present invention to provide a new and improved gas purifier apparatus which allows higher flow rates without unacceptable increase in the pressure vessel diameter.

According to one aspect of the present invention, a gas purifier apparatus is provided, which comprises an elongate housing having an internal chamber and a longitudinal axis, an inlet port for entry of a gas to be purified into the chamber, and an outlet port for exit of purified gas from the chamber, a body of purification medium mounted in the chamber, and a barrier assembly in the chamber for guiding gas to flow in a non-axial path through the purification medium while traveling between the inlet port and outlet port.

In one exemplary embodiment, the barrier assembly comprises an inner tubular sleeve and an outer tubular sleeve extending co-axially from one end of the housing, and the body of purification medium is held between the sleeves. The inner and outer sleeves have perforations along at least part of their length for gas flow through the sleeves and purification medium. In one example, the inlet port is connected to the inner sleeve and the outlet port communicates with an annular chamber outside the outer sleeve, with the gas traveling radially outwardly from the inner sleeve to the outer sleeve. Alternatively, the inlet port may communicate with the annular chamber outside the outer sleeve, with the outlet port connected to the inner sleeve, and the gas traveling radially inwardly from the outer sleeve to the inner sleeve and through the purification medium. In another possible arrangement, an inlet port is provided at each end of the housing, communicating with opposite ends of the inner tube, and the outlet port is connected to the outer annular chamber outside the outer sleeve. This arrangement provides better balance in flow through the entire body of purification medium, and will also allow the housing to be longer without unduly impacting flow rate.

In one embodiment of the invention, the inner tubular sleeve and outer tubular sleeve may extend co-axially from the inlet end of the housing, with each sleeve having opposite first and second ends. The first end of the inner sleeve communicates with the inlet port, and the second ends of the sleeves terminate short of the outlet end of the housing. An end wall is provided across the second ends of the sleeves and the purification medium to prevent gas from flowing axially out of the inner sleeve or purification medium.

This arrangement provides a different, non-axial flow path for the gas through the absorption or purification medium, which provides a reduced pressure drop as compared to an equivalent volume of medium with an axial flow path. This will therefore permit higher flow rates to be achieved simply by extending the length of the housing and filter medium, allowing the necessary additional volume of purification medium to be achieved without increasing the housing diameter. Since the gas flow path through the purification medium is radial, increasing the length of the housing does not change the flow path or increase the pressure drop, unless the flow rate is high enough that the internal diameter of the inner tube will lead to constriction. This can therefore avoid the problems and additional expense involved with an axial flow gas purifier having an internal diameter of greater than six inches, although larger diameters may be used for very high flow rates. Even for diameters over six inches, the purifier will still be less costly to manufacture than a purifier of equivalent flow rate with an axial flow direction.

In an exemplary embodiment, the inner filter sleeve has openings of larger size than those in the outer filter sleeve, so that the inner sleeve will filter out larger particulate contaminants while the outer sleeve will perform fine filtration of any remaining particulates. Alternatively, the flow direction may be reversed with the outer filter sleeve having larger openings. The perforations in the inner sleeve end short of the inlet, and the sleeve has an imperforate inlet end portion in this region. This is because the purifier is oriented to vertically. Settling of the purification media will leave a gap containing no media at the upper or inlet end of the housing. By providing no perforations in the inner tube in this region, the risk of gas by-passing the media is avoided. The purifier may alternatively be run vertically upwardly rather than downwardly with the inlet at the lower end. In this case, any remaining particles after the gas passes through the filter medium will tend to settle downwardly under gravity, and not reach the outlet.

The diameter of the inner sleeve may be of the order of 0.75 inches or more, so that flow in the inner sleeve does not introduce any undesirable pressure drop. In one exemplary embodiment, the inner sleeve diameter was 0.75 inches, the outer sleeve had a diameter of the order of 5 to 5.5 inches, and the housing inner diameter was of the order of 6 to 6.5 inches.

The radial flow path of the gas through the purification medium in this invention allows higher gas flow rates to be accommodated with increased purifier medium surface area without unacceptable increase in the pressure drop. Equivalent flow rates to large diameter vessels can therefore be obtained without the expense and disadvantages resulting from a large pressure vessel diameter. This can be scaled up accordingly to vessels several feet in diameter.

BRIEF DESCRIPTION OF THE DRAWINGS

The present invention will be better understood from the following detailed description of some exemplary embodiments of the invention, taken in conjunction with the accompanying drawings in which like reference numerals refer to like parts and in which:

FIG. 1 is a side view of the gas purifier, partially cut away;

FIG. 2 is a sectional view taken on line 2—2 of FIG. 1;

FIG. 3 is an elongated section showing the filter hole size ratio;

FIG. 4 is a view similar to FIG. 3 illustrating a modified purifier in which the flow direction is reversed.

DETAILED DESCRIPTION OF THE DRAWINGS

Figure 5:
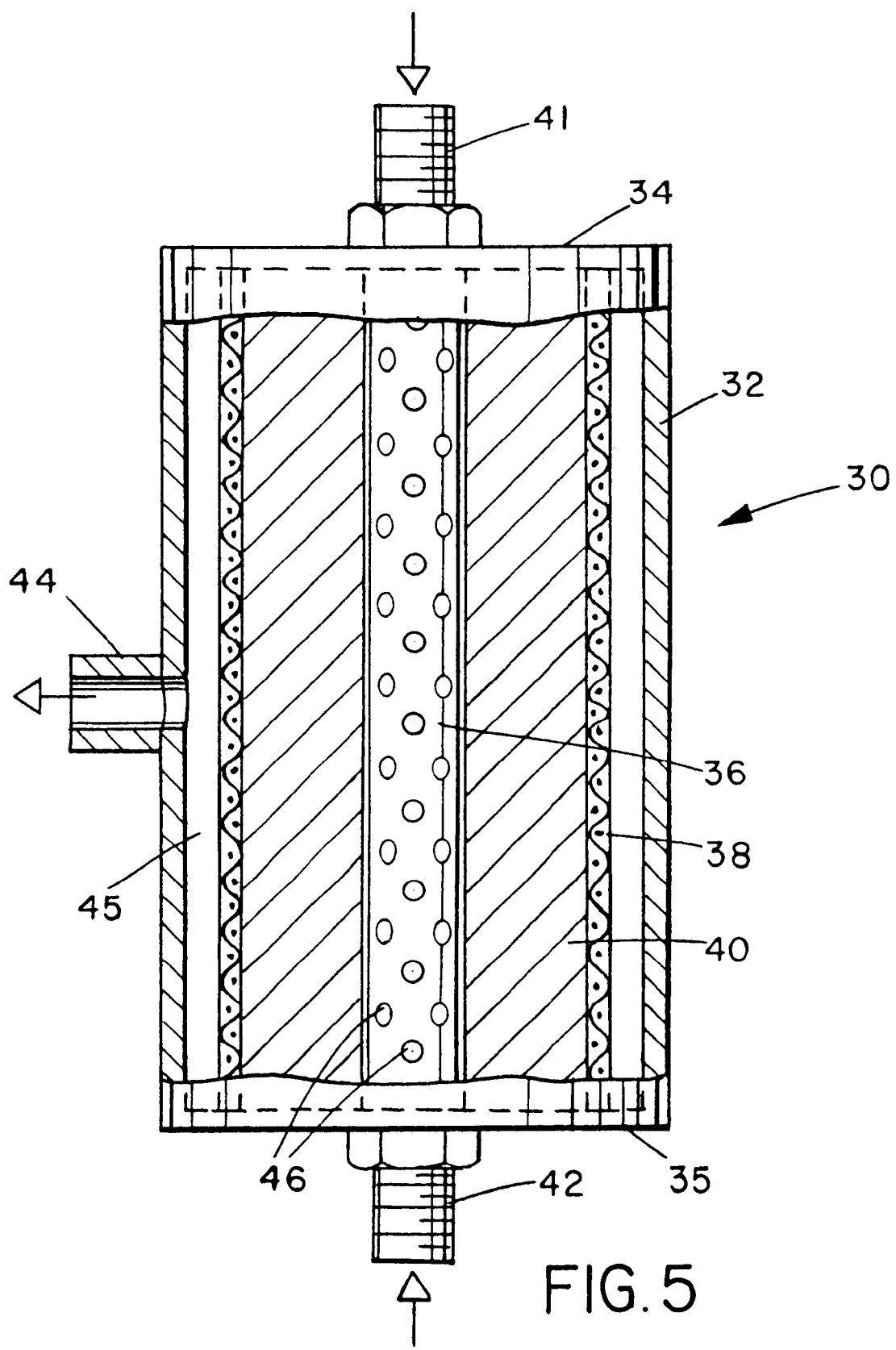
FIG. 5 is a side view of a gas purifier according to another embodiment of the invention, partially cut away.

FIG. 1 illustrates a side view of the gas purifier apparatus 10, partially cut away. The purifier 10 comprises a cylindrical housing 12 that has opposite inlet and outlet ends and an internal air-tight gas chamber. The housing 12 is perforated on both ends in order to allow inlet 14 and outlet 22 ports to be attached to allow for the flow of gas into and out of the housing. Within the purifier 10 is contained an inner tubular filter sleeve 16, a co-axial outer tubular filter sleeve 18, and purification medium 20. The outer housing is of a suitable material such as stainless steel, nickel or hastalloy.

The inner tubular sleeve 16, and outer tubular sleeve 18 extend co-axially from the inlet end of the housing and each have opposite first and second ends. The first end of the inner tubular sleeve communicates with the inlet port 14 and the second end of the outer tubular 18 terminates short of the outlet end of the housing 12 at an end wall 21, with the outer tubular 18 being longer than the inner sleeve 16. The second end of the inner tubular sleeve 16 also comprises a closed end wall. Filter 16 has plurality of openings 24 along most of its length, while the outer filter sleeve is of a fine mesh having smaller openings than sleeve 16.

The purifier housing is designed to operate with a maximum inlet pressure at above atmospheric pressure, in the range of about 15–3600 psig ($10^3$–$2.5 \times 10^6$ kPa). The housing is normally oriented vertically, as indicated in FIG. 1, with the inlet 14 at the upper end. This means that the purification medium 20 will tend to settle and leave a gap at the top of the housing which contains no medium, as can be seen in FIG. 1. The inner filter sleeve 16 therefore has no perforations for a short distance extending from its inlet end, as indicated in FIG. 1, so that gas cannot exit the sleeve in the upper region or gap which contains no purification medium, and cannot bypass the purification medium.

FIG. 2 is a sectional view of the purifier 10 taken on the line 2—2 of FIG. 1. The inner 16 and outer 18 tubular sleeves are defined by second and third diameters respectively. The third diameter is less than the first diameter to define an annular gap between the outer 18 and the inner diameter of the housing 10. The second diameter is less than the third diameter to define an annular chamber between the inner 16 and outer 18 tubular sleeves. The body of purification medium 20 is captured in the annular chamber between the inner and outer sleeves. It will be understood that a conventional fill port (not illustrated) will be provided for adding media to the chamber between the sleeves.

The purification medium may be any suitable material for absorbing gaseous, liquid, or other contaminants from a gas. In an exemplary embodiment, the medium may be of a high surface area metal oxide substrate suitable for removal of gaseous contaminants from a gas stream for use in a manufacturing process such as the production of semiconductors and similar products which cannot tolerate the presence of such contaminants. The material may be a reduced metal or metal oxide with a minimum surface area of 100 $m^2/g$, and is designed to reduce concentration of contaminants to at least 100 ppb, and in an exemplary embodiment the purity level achieved is of the order of one ppb. Such a purification material or composition is described in U.S. Pat. No. 6,241,955 of Alvarez, Jr., which issued on Jun. 5, 2001, the contents of which are incorporated herein by reference. Such a material is designed to remove contaminant gas without catalyzing any reaction in the gas stream or evolving any additional materials into the gas stream. By using such a purification medium in a radial flow purifier as illustrated and described, higher flow rates than were practically possible in the past can be achieved.

The openings 24 in the inner tubular sleeve 16 are designed to be small enough to prevent particles of the purification medium from flowing through the holes. Thus, the size of holes 24 will depend on the nature of the purification medium used. The diameter of the outer housing 12 is suitably no greater than 6.5 inches in order to avoid the need to accommodate ASME regulations for pressure vessels of larger diameters, which would increase expense. However, for some applications, diameters of larger than 6.5 inches may be desired, and the radial flow path provided in this invention will still be preferable to an axial flow purifier of equivalent diameter, in view of the decreased pressure drop. The major advantage of the radial flow design is an increase in the surface area of the purification medium which is exposed to gas. This may be understood with reference to FIG. 3. The efficiency of the purification medium is increased because the gas flow will be most concentrated and at the highest velocity where it enters the purification medium through the inner filter sleeve, and will then spread out through the remainder of the medium before exiting out of the outer sleeve 18.

In an exemplary embodiment, the inner filter sleeve was of a diameter of at least 0.75 inches, since smaller diameters would produce an undesirable pressure drop in gas traveling along the sleeve before exiting radially through the openings 16 in the sleeve. The inner filter sleeve may be of sintered filter tubing or wire mesh having openings in the range from 0.1 micron to wire mesh range. The outer filter sleeve may be a woven wire mesh or sintered metal tube with openings 25 in the range from 0.01 microns to 100 microns. The diameter of the outer filter sleeve in one example was in the range from 5 to 5.5 inches, and the outer housing internal diameter was around 6 inches. This provides the maximum possible volume for filter media in the annular space between the inner and outer sleeves without having an outer housing diameter greater than 6 inches, while ensuring that the inner sleeve diameter, and width of the annular gap between the outer sleeve and housing, are such that the gas can flow readily through these regions without unacceptable increase in pressure drop. However, larger housing diameters may be used if higher flow rates are desired than would be practical by extending the length of a 6 inch diameter housing.

Theoretical modeling has been carried out to prove the effectiveness and efficiency of purifying a gas stream using radial flow as illustrated in FIGS. 1 to 3. Gas enters the system through the small filter, passes through the media bed for purification, and permeates out of the purifier through the large filter. At each stage of the flow process the gas encounters a unique pressure drop. Therefore, each region is mathematically modeled separately then combined to achieve an overall calculation. All pressure drop equations were based on circuit theory to allow representation of the variables using nodal analysis. Following is a statement of Ohm's law, the correlation of electrical to fluid dynamic variables, and a unit analysis step necessary to balance both sides of the equation. The definition of resistance (R) is the resistivity of the material along a given length of wire with cross-sectional area, A. When the corrected definition for resistance was plugged in the following final equation was achieved:

$$\Delta P = Q * L/(k * A)$$

Ohm's Law $V = I * R$

V=voltage~pressure drop ($\Delta P$)

I=current~volumetric flowrate (Q)

R=resistance~f (cross sectional area, length, resistivity)

From these assumptions we can construct unique pressure drop equations for the three sections of the purifier. First, we will calculate the pressure drop through the filters by applying Ohm's law and inserting the analogous variables:

$$V = I * R \rightarrow \Delta P = Q * R$$

$$R = (\rho * L)/A$$

The definition of resistance (R) is the resistivity of wire material along a given length, L of wire with cross-sectional area, A. The resistivity constant ($\rho$) is considered to be analogous to the permeability constant ($\kappa$) for a sintered filter with inverse proportionality, and Q describes the amount of fluid passing through a given cross-sectional area of material. When the corrected definition for resistance is used, the following final equation is achieved:

$$(\rho * L)/A \rightarrow L/(\kappa * A)$$

$$\Delta P = Q * L/(\kappa * A)$$

The next step was to calculate the pressure drop across the media bed. The inert media, composed of reduced nickel catalyst, was the focus for this portion of the theoretical modeling. Using previously recorded pressure drop data, a linear relation between flowrate, resistance, and pressure drop was found. The linear plots from four separate purifier models were graphed on shared axis to compare their slopes. The equation of the trendlines follow the form, y=mx+b, where y is the pressure drop and x is the flowrate. The slope of the lines represented resistance values based on volume. Therefore, multiplying the slope by the volume of the test purifier resulted in a single unique R-value between models. The following table organizes the calculations and indicates the average R-value for this set of data points:

| Model | R/V | R |
|---|---|---|
| 35 K | 0.5000 | 0.0200 |
| 70 k | 0.2333 | 0.0140 |
| 500 k | 0.0486 | 0.0272 |
| Average R-value | | 0.0204 |

Many assumptions were made while constructing the equations above, including: no pressure gradient in the horizontal direction, laminar flow, uniform flow fields, and negligible minor losses associated with nozzle expansion and contraction.

Using this data and the above equation, the pressure drop through the radial design can be predicted. From the calculations the overall pressure drop through a purifier the size of 5 liters would be roughly 2 psid. This is about 1/5 of the pressure drop as compared to an axial flow purifier of equivalent capacity.

In the first embodiment of the invention as illustrated in FIGS. 1 to 3, gas is supplied to the inner filter 16 at one end, and flows radially outwardly through openings in the inner sleeve, through the purification media 20, and out through the outer sleeve 18. Purified gas then travels through the annular outer space in the housing to the outlet end of the housing, as indicated by the arrows in FIGS. 1 and 3. However, in some cases, it may be more practical to arrange for gas flow in the opposite direction, as indicated in the modified embodiment of FIG. 4. In this case, outer filter sleeve 18' is of sintered filter tubing, while inner filter sleeve 16' is of wire mesh having smaller openings than outer tube 18', and the flow direction is reversed. In this embodiment, an inlet at one end of the housing will communicate with the annular outer chamber 26 between the outer filter chamber 18' and wall of the housing 12, while the outlet 22 will be connected to the inner filter sleeve 16' at the opposite end of the housing. In this case, the inner and outer filter sleeves 16' may extend the whole length of the housing, but an imperforate region will be provided at the upper end of the outer tube to prevent gas flow into a settling gap at the upper end of the purification medium.

As indicated in FIG. 4, in this embodiment gas will enter the housing and flow through the annular outer chamber 26, and will then flow radially inwardly through the openings 28 in the outer filter chamber 18', through the purification medium 20, and through the openings in the wire mesh inner sleeve or tube 16'. The purified gas will then flow axially along sleeve 16' to the outlet. In either the embodiment of FIGS. 1 to 3 or that of FIG. 4, the inner and outer tubes or filter sleeve may be of wire mesh, perforated metal tube or sintered metal tubing, and may be made of stainless steel, nickel, or hastalloy. The size of the openings in the respective sleeves will be selected based on the nature of the impurities in the gas to be purified as well as the size of particulates in the purification medium, in order to ensure that the medium is trapped between the two tubes.

FIG. 5 illustrates a purifier 30 according to another embodiment of the invention, which also provides radial flow through a purification medium. The purifier 30 comprises an outer housing 32 with opposite end walls 34,35, and inner and outer tubular sleeves 36,38 extending co-axially within the housing between the opposite end walls. A purification medium 40 of a similar nature to the previous embodiments is trapped between the inner and outer sleeves 36,38. Inlets 41,42 are provided at both ends of the housing and communicate with opposite ends of the inner sleeve 36. A radial outlet 44 is provided on the outer cylindrical wall of the housing and communicates with the outer annular space or chamber 45 between the outer sleeve 38 and wall of the housing. In the illustrated embodiment, the inner sleeve 36 is of perforated tube or sintered tubing with openings 46, while the outer tube is of wire mesh having smaller openings than sleeve 36. The inner sleeve 36 will have an upper end portion adjacent upper end wall 34 which is imperforate, in order to allow for any settling gap in the purification medium, as in the embodiment of FIGS. 1 to 3. In alternative embodiments, the outer sleeve may be of perforated tubing and the inner sleeve may be of wire mesh, or both sleeves may be of wire mesh of different opening sizes.

As illustrated in FIG. 5, gas to be purified is supplied to both inlets 41 and 42 at opposite ends of the inner sleeve 36, and flows radially outwardly through openings 46, purification medium, openings in the outer sleeve 38, and into the annular gap 45. The purified gas then flows along the gap 45 and out via the outlet 44. The advantage of this arrangement is that the housing 32 can be twice as long as in the previous embodiments with equivalent flow rates, without the inner tube or sleeve introducing a constriction in flow. Thus, the flow rate at which the diameter of the housing must be increased in order to accommodate higher flow will be greater than that of the previous embodiments. In addition, this arrangement will provide more uniform flow through the purifier medium, due to gas entering the medium at both ends simultaneously.

The flow direction may also be reversed in this embodiment, if desired, with inlets provided at both ends of the housing into the annular space 45, and an outlet connected to the inner tube 36, as in the embodiment of FIG. 4. As in the previous embodiments, the housing 32, inner tube 36 and outer tube 38 may be of any suitable metal such as stainless steel, nickel, or hastalloy.

In the embodiment of FIG. 1, the housing 32 is oriented vertically with the inlet 14 at the upper end and the outer 22 at the lower end. However, it may be alternatively reversed with inlet 14 at the lower end. This has a potential advantage in that any particles remaining in the gas when it enters the annular space outside the outer 18 will tend to settle to the bottom of the housing and not travel out through outlet port 22.

Although in the illustrated embodiments the purification medium is captured in an annular space between inner and outer filter sleeves with closed ends to define a radial flow path for gas through the purification medium, other arrangements are possible which would also define non-axial flow paths. For example, the purification medium may simply be constrained by a suitable barrier preventing axial flow through the medium and out of the exit port, with the barrier defining a passageway for gas out of the outlet port. The inner filter sleeve may be eliminated, with the filter medium filling the interior of an outer filter sleeve of smaller diameter than the housing, which is sealed at its outer end by a suitable barrier or imperforate end wall. Other non-axial flow path arrangements may also be devised, although the radial flow design illustrated is believed to produce optimum performance.

The radial flow purifier of this invention will therefore permit higher flow rates to be accommodated at reduced pressure drops, and without needing large diameters to provide the necessary purification media volume. The purifier can be extended to any desired length in order to provide equivalent flow rates to a large diameter pressure vessel. By changing the flow path of the gas through the purification medium from axial to radial, purification efficiency can be increased and the expense of a large diameter purifier is avoided.

Although some exemplary embodiments of the invention have been described above by way of example only, it will be understood by those skilled in the field that modifications may be made to the disclosed embodiments without departing from the scope of the invention, which is defined by the appended claims.

We claim:

1. A gas purifier apparatus designed for operation at pressures above atmospheric pressure, the apparatus comprising:
    a vertically oriented, pressure vessel housing designed to withstand pressures above atmospheric pressure;
    an inlet port and an outlet port contained on opposite ends of the housing and perforating said housing to allow for the flow of gas into and out of the housing;
    an inner tubular sleeve contained centrally within the housing and connected to the inlet port;
    an outer tubular sleeve contained within the housing at a position located co-axially between the housing and the inner tubular sleeve and defining an annular space between the inner and outer sleeves;
    the housing and tubular sleeves each being of metallic material;
    a body of purification medium captured between the inner and outer tubular sleeves, the purification medium comprising a reduced metal or metal oxide with a minimum surface area of 100 $m^2/g$;
    the inner and outer sleeves and annular space having closed ends terminating short of the outlet end of the housing;
    whereby gas entering the inlet port travels radially outwardly through the inner sleeve, purification medium and the outer sleeve before exiting through the outlet port; and
    the purification medium is of a material for purifying gas to purity levels of at least 10 ppm for any individual molecular contaminant species.

2. The apparatus claimed in claim 1 wherein the housing is generally cylindrical in shape, and defines a internal gas-tight air chamber of a first diameter.

3. The apparatus as claimed in claim 2 wherein the inner tubular sleeve extends co-axially from the inlet port at the inlet end of the housing.

4. The apparatus as claimed in claim 3 wherein the outer tubular sleeve extends co-axially from the inlet end of the housing and has opposite first and second ends, and an end wall extends across the second ends of the inner and outer sleeves.

5. The apparatus as claimed in claim 1, wherein the inlet port is located at the upper end of the housing.

6. The apparatus as claimed in claim 1, wherein the purification medium is of a material for purifying gas to purity levels of the order of 1 ppb.

7. The apparatus as claimed in claim 1, wherein the inner sleeve has a diameter of at least 0.75 inches.

8. The apparatus as claimed in claim 7, wherein the housing has an inner diameter in the range up to 6 inches.

9. The apparatus as claimed in claim 8, wherein the outer sleeve has a diameter in the range from 5 to 5.5 inches.

10. The apparatus as claimed in claim 1, wherein the outer sleeve has openings in the range from 0.01 microns to 100 microns.

11. The apparatus as claimed in claim 10, wherein the outer sleeve is a perforated metal tube.

12. A gas purifier apparatus designed for operation at pressures above atmospheric pressure, the apparatus comprising:
- a vertically oriented, pressure vessel housing designed to withstand pressures above atmosphere pressure;
- an inlet port and an outlet port contained on opposite ends of the housing and perforating said housing to allow for the flow of gas into and out of the housing;
- an inner tubular sleeve contained centrally within the housing and connected to the inlet port;
- an outer tubular sleeve contained within the housing at a position located co-axially between the housing and the inner tubular sleeve and defining an annular space between the inner and outer sleeves;
- the housing and tubular sleeves each being of metallic material;
- a body of purification medium captured between the inner and outer tubular sleeves;
- the inner and outer sleeves and annular space having closed ends terminating short of the outlet end of the housing;
- whereby gas entering the inlet port travels radially outwardly through the inner sleeve, purification medium and the outer sleeve before exiting through the outlet port;
- the inlet port is located at the upper end of the housing; and
- the annular space between the inner and outer sleeves includes a gap extending from the inlet port which contains no purification medium, and the inner sleeve has an upper end portion of predetermined length extending through said gap which is imperforate.

13. A gas purifier apparatus designed for operating at pressures above atmospheric pressure, comprising:
- a vertically oriented pressure vessel housing designed to withstand pressures higher than atmospheric pressure;
- an inlet port and an outlet port contained on opposite ends of the housing and perforating said housing to allow for the flow of gas into and out of the housing;
- an inner tubular sleeve contained centrally within the housing and connected to the inlet port;
- an outer tubular sleeve contained within the housing at a position located co-axially between the housing and the inner tubular sleeve and defining an annular space between the inner and outer sleeves;
- the housing and tubular sleeves being of metallic material;
- a body of purification medium captured between the inner and outer tubular sleeves;
- the inner and outer sleeves and annular space having closed ends terminating short of the outlet end of the housing;
- whereby gas entering the inlet port travels radially outwardly through the inner sleeve, purification medium and the outer sleeve before exiting through the outlet port; and
- the inner sleeve has filter openings of a first pore size and the outer sleeve has filter openings of a second pore size less than said first pore size.

14. The apparatus as claimed in claim 13, wherein the inner sleeve comprises a single layer, perforated metal tube and the outer sleeve comprises a single layer of wire mesh.

15. The apparatus as claimed in claim 13, wherein the filter opening size ratio is 5:1.

16. A gas purifier apparatus designed for operation at pressures above atmospheric pressure, the apparatus comprising:
- a vertically oriented, pressure vessel housing designed to withstand pressures above atmospheric pressure;
- an inlet port and an outlet port contained on opposite ends of the housing and perforating said housing to allow for the flow of gas into and out of the housing;
- an inner tubular sleeve contained centrally within the housing and connected to the inlet port;
- an outer tubular sleeve contained within the housing at a position located co-axially between the housing and the inner tubular sleeve and defining an annular space between the inner and outer sleeves;
- the housing and tubular sleeves each being of metallic material;
- a body of purification medium captured between the inner and outer tubular sleeves;
- the inner and outer sleeves and annular space having closed ends terminating short of the outlet end of the housing;
- whereby gas entering the inlet port travels radially outwardly through the inner sleeve, purification medium and the outer sleeve before exiting through the outlet port; and
- one of the sleeves has openings in the range from 0.01 microns to 100 microns.

17. The apparatus as claimed in claim 16, wherein the inner sleeve is a perforated metal tube.

18. The apparatus as claimed in claim 16, wherein the inner sleeve is of wire mesh.

19. A gas purifier apparatus, comprising:
- a housing having an internal chamber, and a longitudinal axis, the housing being oriented vertically and comprising a pressure vessel designed to withstand gas pressures above atmospheric pressure;
- an inlet port for gas supply to the chamber;
- an outlet port for exit of gas from the chamber;
- a body of purification medium mounted in the chamber, the purification medium comprising a reduced metal or metal oxide with a minimum surface area of 100 m$^2$/g;
- a barrier means in the chamber for preventing axial flow of gas through the purification medium and defining a passageway for gas from the purification medium out of the outlet port; and
- the body and barrier means together defining a non-axial flow path of gas through the purification medium.

20. A gas purifier apparatus for removing a contaminant from a gas stream, the level of contaminant being less than 100 ppm, the apparatus comprising:
- a cylindrically shaped housing having opposite ends and an internal chamber of a first diameter, the housing being oriented vertically and comprising a pressure vessel designed to withstand gas pressures above atmospheric pressure;
- an inlet port and an outlet port for flow of gas into and out of the housing;
- an inner tubular sleeve and an outer tubular sleeve extending coaxially within the chamber to define a first annular space between the inner sleeve and outer sleeve and a second annular space between the outer sleeve and housing;
- a body of purification medium captured in the first annular space between the inner and outer tubular sleeves, the purification medium comprising a reduced metal or metal oxide having a surface area of at least 100 m$^2$/g;
- one of the ports being connected to the inner tubular sleeve and the other port being connected to the second annular space outside the outer sleeve;

the sleeves each having openings for gas flow in a radial direction through the sleeves and captured purification medium; and the purification medium being adapted to reduce concentration of said contaminant in said gas stream to a level of not more than 10 ppm.

21. The apparatus as claimed in claim 20, wherein the inlet port is connected to one end of the inner tubular sleeve and the outlet port is connected to the second annular space, whereby gas flows through the inner sleeve and radially outwardly through the inner sleeve, purification medium, and outer sleeve.

22. The apparatus as claimed in claim 21, wherein the housing has an inlet end and an opposite outlet end, each sleeve extends from the inlet end of the housing and terminates short of the outlet end of the housing, and the inlet port is located at the inlet end and the outlet port is located at the outlet end of the housing.

23. The apparatus as claimed in claim 20, wherein the outlet port is connected to one end of the inner tubular sleeve and the inlet port is connected to the second annular space, whereby gas flows into the second annular space and radially inwardly through the outer sleeve, purification medium, and inner sleeve to the outlet port.

24. The apparatus as claimed in claim 20, wherein the purification medium is adapted to reduce concentration of said contaminant to a level of not more than 1 ppb.

25. A gas purifier apparatus, comprising:

a cylindrically shaped housing having opposite ends and an internal chamber of a first diameter;

an inlet port and an outlet port for flow of gas into and out of the housing;

an inner tubular sleeve and an outer tubular sleeve extending coaxially within the chamber to define a first annular space between the inner sleeve and outer sleeve and a second annular space between the outer sleeve and housing;

a body of purification medium captured in the first annular space between the inner and outer tubular sleeves;

one of the ports being connected to the inner tubular sleeve and the other port being connected to the second annular space outside the outer sleeve;

the sleeves each having openings for gas flow in a radial direction through the sleeves and captured purification medium; and the inner and outer sleeves extending for the whole length of the chamber between opposite ends of the housing, a first inlet port is connected to the innerسleeve at one end of the housing, a second inlet port is connected to the inner sleeve at the opposite end of the housing, and the outlet port is connected to the second annular space, whereby gas flows from both inlet ports into opposite ends of the inner sleeve, and radially outwardly through the inner sleeve, purification medium, and outer sleeve to the outlet port.

26. An ultra-high purity gas purifier apparatus for removing a contaminant from a gas stream of gas for use in a manufacturing process, comprising:

a cylindrically shaped housing having opposite ends and an internal chamber of a first diameter, the housing being oriented vertically and comprising a pressure vessel designed to withstand gas pressures above atmospheric pressure;

an inlet port and an outlet port for flow of gas into and out of the housing;

an inner tubular sleeve and an outer tubular sleeve extending coaxially within the chamber to define a first annular space between the inner sleeve and outer sleeve and a second annular space between the outer sleeve and housing;

a body of purification medium captured in the first annular space between the inner and outer tubular sleeves, the purification medium comprising a high surface area metal oxide which is substantially unaffected by said gas flow;

one of the ports being connected to the inner tubular sleeve and the other port being connected to the second annular space outside the outer sleeve;

the sleeves each having openings for gas flow in a radial direction through the sleeves and captured purification medium; and whereby the purification medium is adapted to reduce concentration of said contaminant in said gas stream to not more than 100 ppb without evolving any new materials into said gas stream.

27. A gas purifier apparatus designed for operating at pressures above atmospheric pressure, comprising:

a vertically oriented pressure vessel housing designed to withstand pressures higher than atmospheric pressure;

an inlet port and an outlet port on the housing and perforating said housing to allow for the flow of gas into and out of the housing;

an inner tubular sleeve contained centrally within the housing and connected to the outlet port;

an outer tubular sleeve contained within the housing at a position located co-axially between the housing and the inner tubular sleeve and defining an annular space between the inner and outer sleeves connected to the inlet port;

the housing and tubular sleeves being of metallic material;

a body of purification medium captured between the inner and outer tubular sleeves;

whereby gas entering the inlet port travels radially inwardly through the outer sleeve, purification medium and the inner sleeve before exiting through the outlet port; and the inner sleeve has filter openings of a first pore size and the outer sleeve has filter openings of a second pore size greater than said first pore size.

28. An ultra-high purity gas purifier apparatus for removing a contaminant from a gas stream of gas for use in a manufacturing process, comprising:

a cylindrically shaped housing having opposite ends and an internal chamber of a first diameter, the housing being oriented vertically and comprising a pressure vessel designed to withstand gas pressures above atmospheric pressure;

an inlet port and an outlet port for flow of gas into and out of the housing;

an inner tubular sleeve and an outer tubular sleeve extending coaxially within the chamber to define a first annular space between the inner sleeve and outer sleeve and a second annular space between the outer sleeve and housing;

a body of purification medium captured in the first annular space between the inner and outer tubular sleeves, the purification medium comprising a high surface area reduced metal or metal oxide which is substantially unaffected by said gas flow;

one of the ports being connected to the inner tubular sleeve and the other port being connected to the second annular space outside the outer sleeve;

the sleeves each having openings for gas flow in a radial direction through the sleeves and captured purification medium; and whereby the purification medium is adapted to reduce concentration of said contaminant in said gas stream to not more than 10 ppm without evolving any new materials into said gas stream.

* * * * *